US009393493B2

(12) United States Patent  
Danny

(10) Patent No.: US 9,393,493 B2  
(45) Date of Patent: Jul. 19, 2016

(54) GAMING DEVICE WITH HAPTIC EFFECT ISOLATED TO USER INPUT ELEMENTS

(71) Applicant: Immersion Corporation, San Jose, CA (US)

(72) Inventor: Grant Danny, Laval (CA)

(73) Assignee: Immersion Corporation, San Jose, CA (US)

( * ) Notice: Subject to any disclaimer, the term of this patent is extended or adjusted under 35 U.S.C. 154(b) by 155 days.

(21) Appl. No.: 14/078,478

(22) Filed: Nov. 12, 2013

(65) Prior Publication Data

US 2015/0133221 A1    May 14, 2015

(51) Int. Cl.
*A63F 13/285* (2014.01)
*A63F 13/24* (2014.01)
*G06F 3/01* (2006.01)
*A63F 13/92* (2014.01)
*A63F 13/98* (2014.01)

(52) U.S. Cl.
CPC ............... *A63F 13/285* (2014.09); *A63F 13/24* (2014.09); *A63F 13/92* (2014.09); *A63F 13/98* (2014.09); *G06F 3/016* (2013.01)

(58) Field of Classification Search
None
See application file for complete search history.

(56) References Cited

U.S. PATENT DOCUMENTS

| | | | |
|---|---|---|---|
| 6,563,487 B2 * | 5/2003 | Martin et al. | ................. 345/156 |
| 7,973,769 B2 | 7/2011 | Olien | |
| 8,508,486 B2 | 8/2013 | Grant et al. | |
| 2003/0109314 A1 | 6/2003 | Ku | |
| 2004/0137983 A1 | 7/2004 | Kerr | |
| 2005/0231476 A1 | 10/2005 | Armstrong | |
| 2009/0085882 A1 * | 4/2009 | Grant et al. | .................... 345/173 |
| 2013/0194085 A1 | 8/2013 | Grant et al. | |
| 2015/0018101 A1 * | 1/2015 | Schoenith et al. | ............... 463/37 |

FOREIGN PATENT DOCUMENTS

| | | |
|---|---|---|
| GB | 2492968 A | 1/2013 |
| WO | 99/17850 A1 | 4/1999 |
| WO | 99/17850 A2 | 4/1999 |
| WO | 2014/078902 A1 | 5/2014 |

OTHER PUBLICATIONS

European Search Report, EP Application No. 14 19 2032.2, Dated Feb. 19, 2015.
"European Search Report", EP Application #: 14 19 2032.2, mailed May 11, 2015.

* cited by examiner

*Primary Examiner* — Milap Shah
*Assistant Examiner* — Robert T Clarke, Jr.
(74) *Attorney, Agent, or Firm* — Medler Ferro Woodhouse & Mills PLLC

(57) ABSTRACT

A user input device includes a housing, a user input element adapted to be operated by a user and configured to send a signal to a processor when operated by the user, and an actuator coupled to the user input element. The actuator is configured to receive a control signal from the processor and output a haptic effect to the user input element in response to the control signal from the processor. A vibration isolation barrier is disposed between the user input element and the housing, wherein the vibration isolation barrier substantially mechanically isolates the user input element from the housing. The user input element may be a joystick, button, or trigger.

24 Claims, 7 Drawing Sheets

GAMING DEVICE WITH HAPTIC EFFECT ISOLATED TO USER INPUT ELEMENTS

FIELD OF THE INVENTION

Embodiments hereof relate to devices with actuators attached to user input elements such that the haptic effect is isolated to the user input elements.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed devices to alert the user to specific events, or provide realistic feedback to user regarding interaction of the medical device with the patient at the distal end of the medical device.

Conventional haptic feedback systems for gaming and other devices generally include an actuator for generating the haptic feedback attached to the housing of the controller/peripheral. However, in these conventional haptic feedback systems create a haptic sensation along the entire body of the device/controller. Such a device does not provide a targeted haptic sensation to the user for specific actions or locations. Also, relatively large actuators are needed to create a satisfactory haptic sensation when the haptic sensation is distributed across the entire controller. For example, and not by way of limitations, gaming tablets (as shown in FIG. 1) generally include a controller which includes handles with user input elements such as joysticks, buttons, and triggers, and a docking portions for receiving a tablet style computer. However, such a gaming tablet, with the tablet computer installed in the controller, may weigh over a kilogram. Producing haptic sensations on such a device requires large actuators.

SUMMARY OF THE INVENTION

Embodiments hereof are directed to a user input device including a housing adapted to be held by a user, a user input element adapted to be operated by the user and configured to send a signal to a processor when operated by the user, and an actuator coupled to the user input element. The actuator is configured to receive a control signal from the processor and output a haptic effect to the user input element in response to the control signal from the processor. A vibration isolation barrier may be disposed between the user input element and the housing such that the vibration isolation barrier substantially mechanically isolates the user input element from the housing. The vibration isolation barrier may be a material such as foam materials, urethane foams, polyurethane, viscoelastic materials, and rubber. In other embodiments the vibration isolation barrier may be a spring or plurality of springs. The user input element may be a button, joystick, or trigger. The vibration isolation barrier may isolate the user input element from the housing or may isolate a first portion of the user input element from the remainder of the user input element, thereby also isolating the portion of the user input element from the housing. By isolating the haptic effect of the actuator to the user input element or a portion of the user input element, the haptic effect is directed to the location where the user contacts the user input device and the actuator may be smaller to produce an equivalent haptic effect of an actuator that is not isolated to the user input element. The user input device may be a game controller, tablet, phone, personal digital assistant (PDA), computer, gaming peripheral, wearable user items including an input device, or other devices which include user input elements.

Embodiments hereof are also directing to a gaming system including a host computer, a processor, and a controller. The game controller includes a housing adapted to be held by a user, a user input element adapted to be operated by the user and configured to send a signal to the processor when operated by the user, and an actuator coupled to the user input element. The actuator is configured to receive a control signal from the processor and output a haptic effect to the user input element in response to the control signal from the processor. A vibration isolation barrier is disposed between the user input element and the housing such that the vibration isolation barrier substantially mechanically isolates the user input element from the housing. The processor may be disposed in the host computer or in the controller. The vibration isolation barrier may be a material such as foam materials, urethane foams, polyurethane, viscoelastic materials, and rubber. In other embodiments the vibration isolation barrier may be a spring or plurality of springs. The user input element may be a button, joystick, or trigger. The vibration isolation barrier may isolated the user input element from the housing or may isolate a portion of the user input element from the remainder of the user input element, thereby also isolating the portion of the user input element from the housing.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other devices having user input elements.

Figure 1:
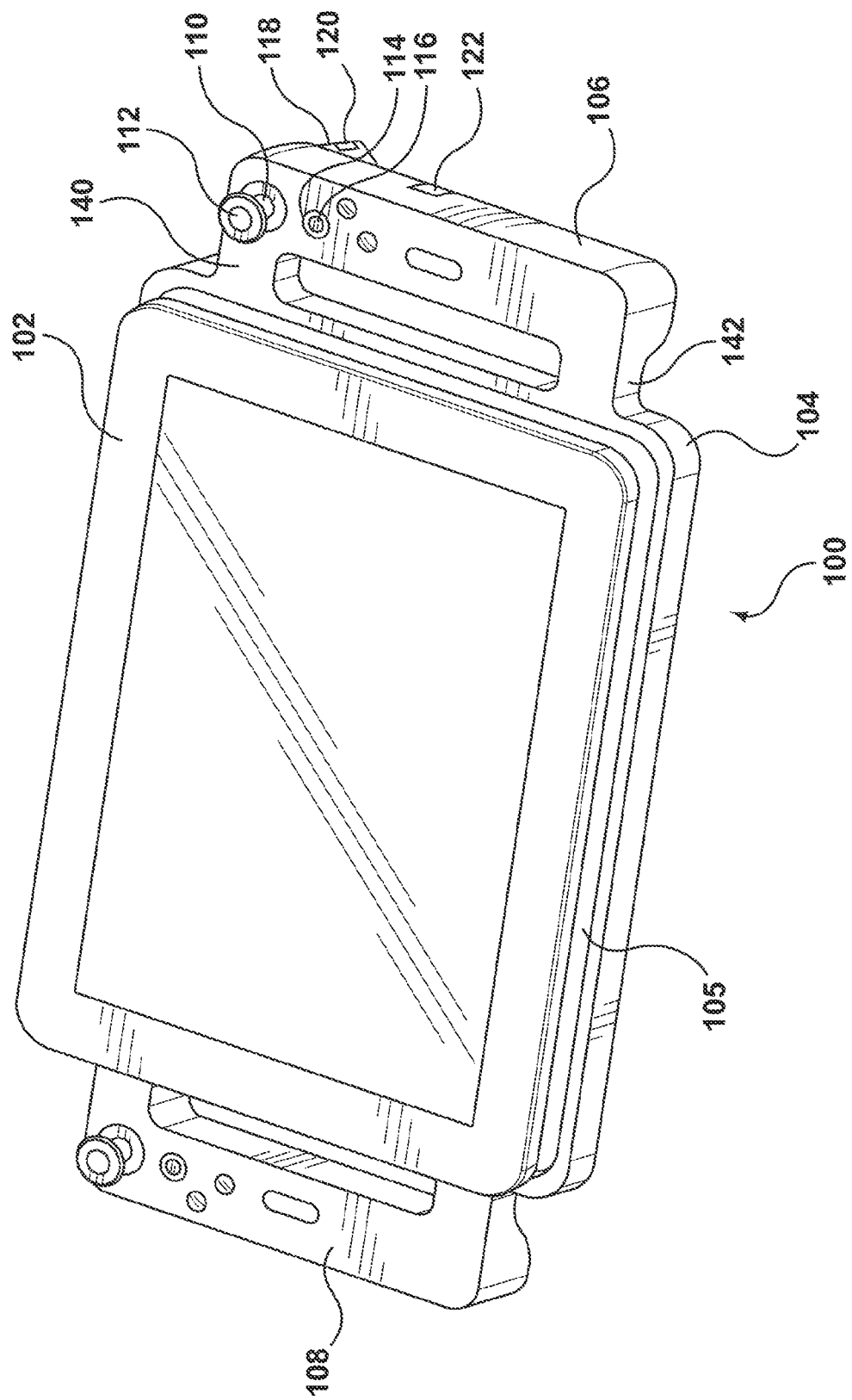
FIG. 1 is a schematic illustration of an embodiment of a gaming tablet.
Figure 3:
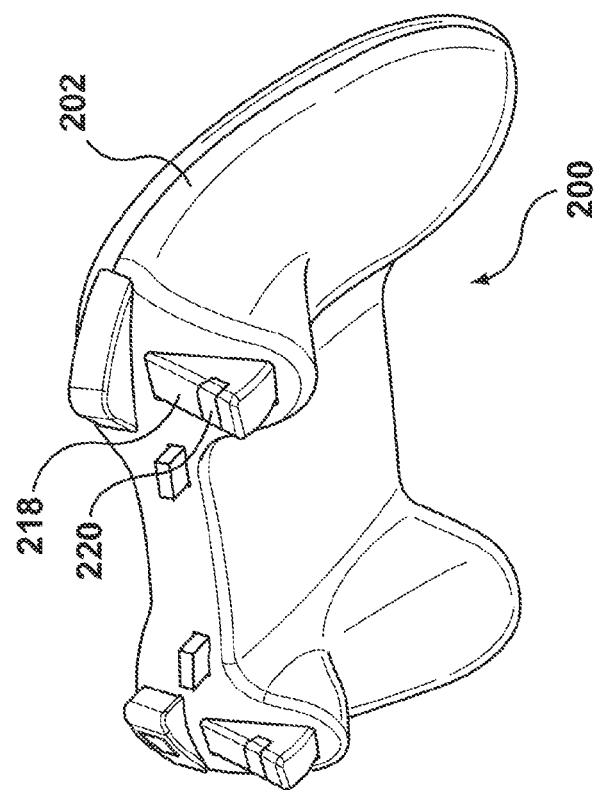
FIG. 3 is a schematic illustration of another view of the controller of FIG. 2.
Figure 2:
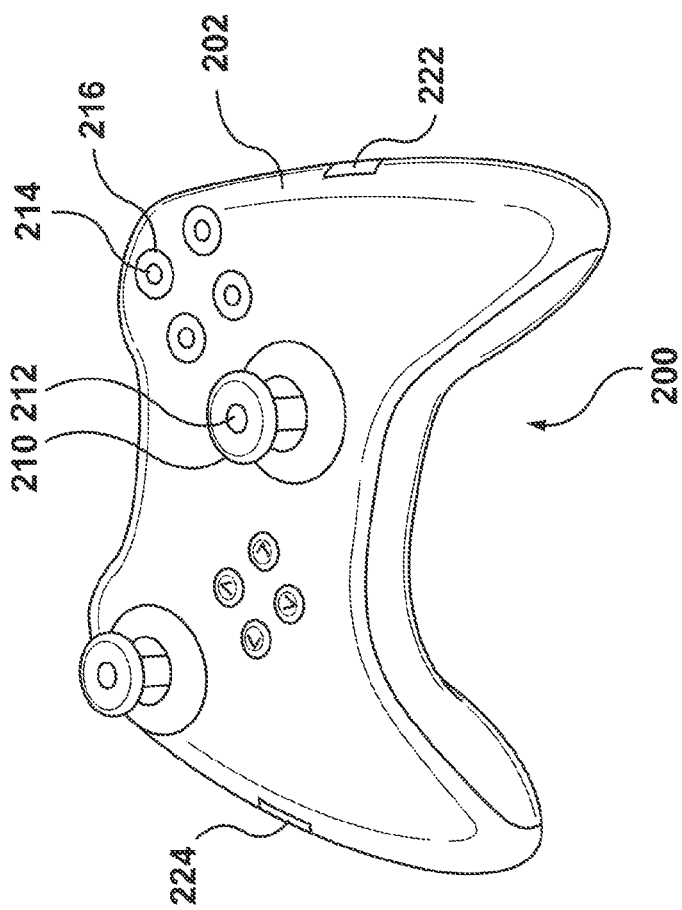
FIG. 2 is a schematic illustration of an embodiment of controller.

Embodiments hereof relate to a gaming tablet 100 as shown in FIG. 1, a controller 200 for a gaming system as shown in FIGS. 2-3, or other controllers that having user input (UI) elements such as, but not limited to, phones, personal digital assistants (PDA), tablets, computers, gaming peripherals, and other controllers for gaming systems known to those skilled in the art.

Gaming tablet 100 shown in FIG. 1 includes a tablet computer 102 and a controller 104. Tablet computer 102 may be designed specifically for gaming activities, such as is available from Razer Inc., or may be a tablet computer well known and available in the market, such as an Apple® Ipad®, Kindle® Fire®, and Samsung® Galaxy Tab®. Controller 104 includes a docking portion 105 configured to receive tablet computer 102 and handles 106, 108 with user input elements disposed thereon for a user to control a game on tablet computer 102. Docking portion 105 connects controller 104 to tablet computer 102 such that actions by the user on handles 106, 108, such as pressing buttons, moving joysticks, pressing triggers, etc., result in actions on the game being played on tablet computer 102.

Handles 106, 108 include typical user input elements found on controllers. The user input elements will be described with respect to handle 106. However, those skilled in the art would recognize that the same or similar user input elements may be used on handle 108. In particular, handle 106 includes a joystick 110, a button 114, and a trigger 118. As can be seen in FIG. 1 and known to those skilled in the art, more than one of each of these user input elements may be included on each handle 106, 108. Accordingly, the present description of a joystick 110, for example, does not limit handle 106 or controller 104 to a single joystick. In the embodiment shown in FIG. 1, joystick 110 includes an actuator 112 attached thereto, button 114 includes an actuator 116 attached thereto, and trigger 118 includes an actuator 120 attached thereto. Further, handle 106 includes an actuator 122 attached thereto in a location where a hand of the user is generally located. Other actuators and user input elements may be included on controller 104.

Actuators 112, 116, 120, 122 may include electromagnetic motors, eccentric rotating mass ("ERM") actuators in which an eccentric mass is moved by a motor, linear resonant actuators ("LRAs") in which a mass attached to a spring is driven back and forth, shape memory alloys, electro-active polymers that deform in response to signals, mechanisms for changing stiffness, vibrotactile actuators, inertial actuators, piezoelectric actuators, or other suitable types of actuating devices. In one embodiment, actuators 112, 116, 120, 122 can be implemented as an inertial actuator to provide vibrotactile feedback to the user. In another embodiment, the actuators may use kinesthetic haptic feedback including, for example, solenoids to change the stiffness/damping of handle 106, small air bags that change size in handle 106, or shape changing materials.

Figure 21:
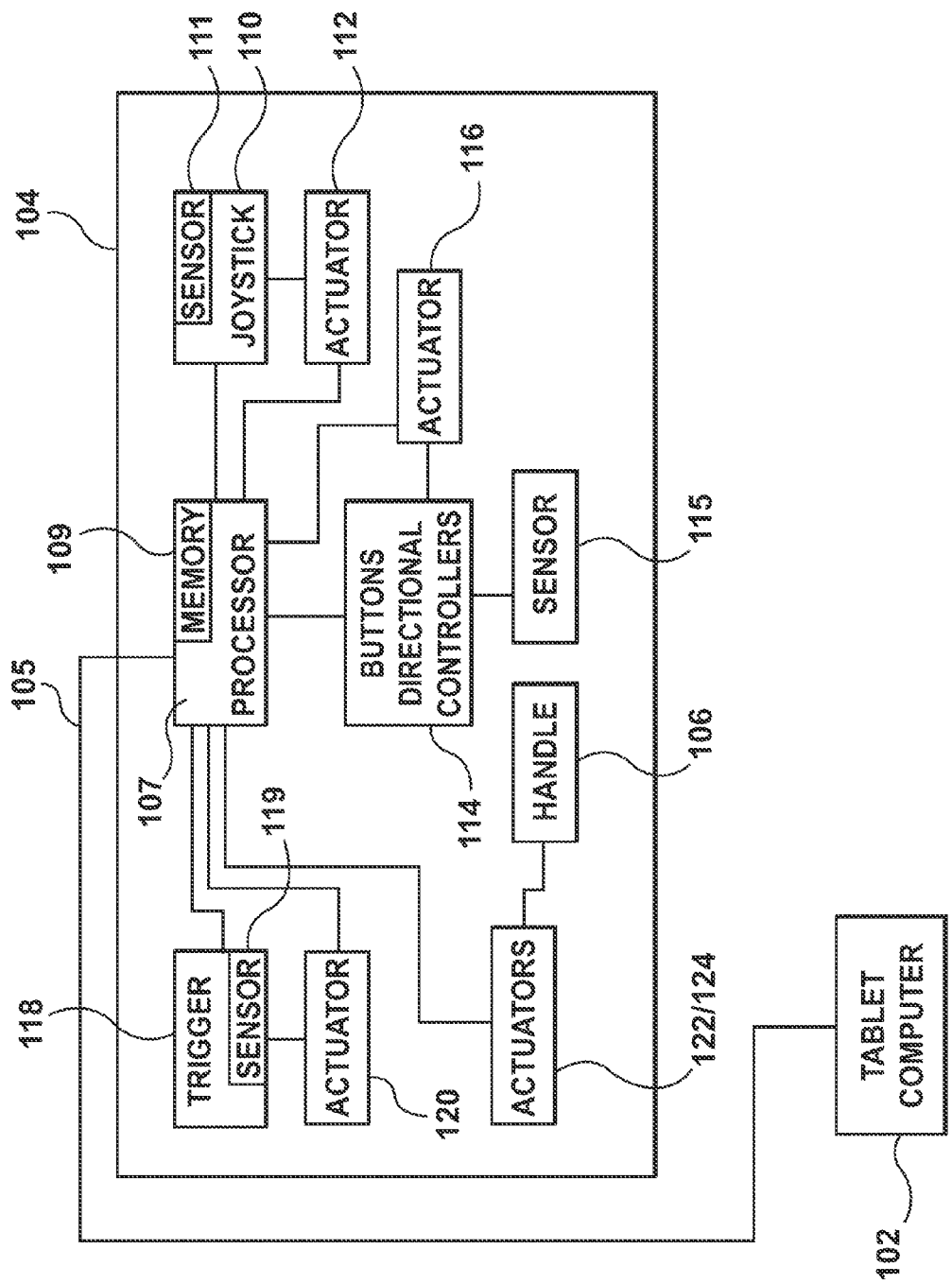
FIG. 21 is a block diagram of the gaming table of FIG. 1.

FIG. 21 illustrates a block diagram of the gaming tablet of FIG. 1 in accordance with an embodiment. As shown in FIG. 21, controller 104 includes a local processor 107 which communicates with tablet computer 102 via docking portion 105. Other connections, such as wires or wireless connections, may be used instead of docking portion 105. Tablet computer 102 in this embodiment includes a display screen. Controller 104 may be alternatively configured to not include local processor 107, whereby all input/output signals from controller 104 are handled and processed directly by tablet computer 102.

Processor 107 is coupled to joystick 110, buttons 114, and trigger 118, and to sensors 111, 115, and 119 that may be coupled to joystick 110, buttons 114, and trigger 118, respectively. The block diagram of FIG. 21 shows only one (1) of each of joystick 110, buttons 114, and trigger 118. However, those skilled in the art would understand that multiple joysticks, buttons, and triggers, as well as other user input elements, may be used, as described above. Actuators 112, 116, and 120 are coupled to joystick 110, buttons 114, and trigger 118. Actuators 112, 116, 120 are also coupled to processor 107, which provides haptic effect signals to the actuators 112, 116, 120 based on high level supervisory or streaming commands from tablet computer 102. In the streaming embodiment, the voltage magnitudes and durations are streamed to controller 104 where information is provided by the tablet computer 102 to the actuators. In operation, tablet computer 102 may provide high level commands to the processor 107 such as the type of haptic effect to be output (e.g. vibration, jolt, detent, pop, etc.) by one or more selected actuators, whereby the processor 107 instructs the actuator as to particular characteristics of the haptic effect which is to be output (e.g. magnitude, frequency, duration, etc.). Processor 107 may retrieve the type, magnitude, frequency, duration, or other characteristics of the haptic effect from a memory 109 coupled to processor 107. The haptic effects provide the user with a greater sense of immersion to the game as multiple modalities are being simultaneously engaged, e.g., video, audio, and haptics.

FIGS. 2-3 show a controller 200 generally used with a gaming system that may be connected to a computer, mobile phone, television, or other similar device. Such a gaming system includes a processor (not shown). Controller 200 is connected to the processor either wirelessly or using a wire connected to a port (not shown) on controller 200 and a port in the processor, as known to those skilled in the art. Those skilled in the art would recognize that controller 200 is merely an exemplary embodiment of a controller, and that controllers with other configurations of user input elements, shapes, and sizes may be used.

Controller 200 includes a joystick 210, a button 214, and a trigger 218. As can be seen in FIGS. 2-3 and known to those skilled in the art, more than one of each user input element and additional user input elements may be included on controller 200. Accordingly, the present description of a joystick 210, for example, does not limit controller 200 to a single joystick. In the embodiment shown in FIGS. 2-3, joystick 210 includes an actuator 212 attached thereto, button 214 includes an actuator 216 attached thereto, and trigger 218 includes an actuator 220 attached thereto. Further, a housing 202 of controller 200 includes actuators 222, 224 attached thereto in a location where a hand of the user is generally located. Other actuators and user input elements may be included on controller 200.

Actuators 212, 216, 220, 222, 224 may include electromagnetic motors, eccentric rotating mass ("ERM") actuators in which an eccentric mass is moved by a motor, linear resonant actuators ("LRAs") in which a mass attached to a spring is driven back and forth, shape memory alloys, electro-active polymers that deform in response to signals, mechanisms for changing stiffness, vibrotactile actuators, inertial actuators, piezoelectric actuators, or other suitable types of actuating devices. In one embodiment, actuators 212, 216, 220, 222, 224 can be implemented as an inertial actuator to provide vibrotactile feedback to the user. In another embodiment, the actuators may use kinesthetic haptic feedback including, for example, solenoids to change the stiffness/damping of handle 106, small air bags that change size in handle 106, or shape changing materials.

Figure 22:
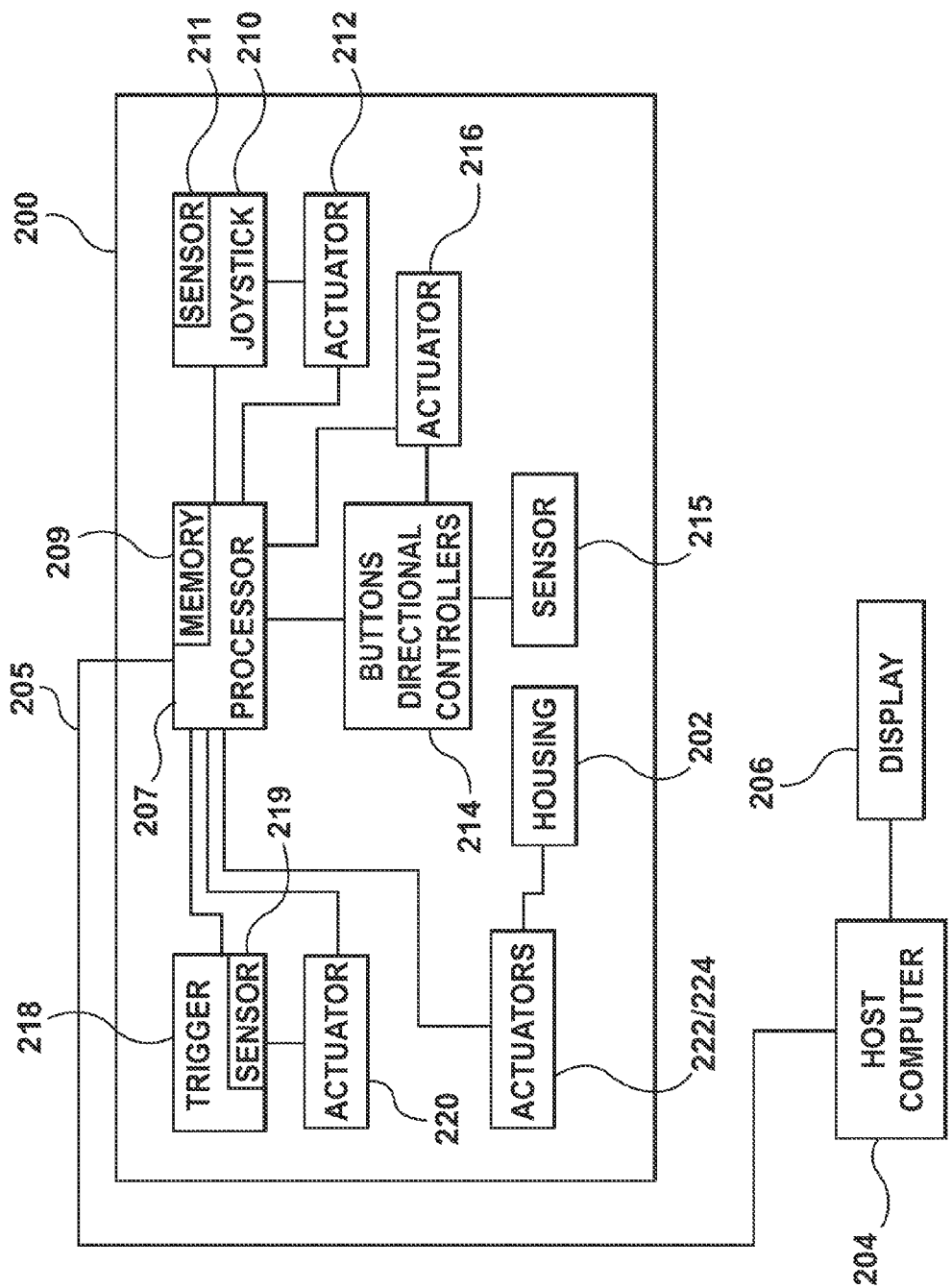
FIG. 22 is a block diagram of the controller of FIG. 2 in conjunction with a host computer and display.

FIG. 22 illustrates a block diagram of controller 200 of FIGS. 2-3 in accordance with an embodiment. As shown in FIG. 22, controller 200 includes a local processor 207 which communicates with a host computer 204 via a connection 205. Controller 200 may be alternatively configured to not include local processor 207, whereby all input/output signals from controller 200 are handled and processed directly by host computer 204. Connection 205 may be a wired connection, a wireless connection, or other types of connections known to those skilled in the art. Host computer 204 is coupled to a display screen 206. In an embodiment, host computer 204 is a gaming device console and display screen 206 is a monitor which is coupled to the gaming device console, as known in the art. In another embodiment, as known to those skilled in the art, host computer 204 and display screen 206 may be combined into a single device.

Processor 207 is coupled to joystick 210, button 214, and trigger 218, and to sensors 211, 215, and 219 that may be coupled to joystick 210, button 214, and trigger 218, respectively. The block diagram of FIG. 22 shows only one (1) of each of joystick 210, button 214, and trigger 218. However, those skilled in the art would understand that multiple joysticks, buttons, and triggers, as well as other user input elements, may be used, as described above. Actuators 212, 216, and 220 are coupled to joystick 210, button 214, and trigger 218, respectively. Actuators 212, 216, 220 are also coupled to processor 207, which provides haptic effect signals to the actuators 212, 216, 220 based on high level supervisory or streaming commands from host computer 204. In the streaming embodiment, the voltage magnitudes and durations are streamed to controller 200 where information is provided by the host computer 204 to the actuators. In operation, host computer 204 may provide high level commands to the processor 207 such as the type of haptic effect to be output (e.g. vibration, jolt, detent, pop, etc.) by one or more selected actuators, whereby the processor 207 instructs the actuator as to particular characteristics of the haptic effect which is to be output (e.g. magnitude, frequency, duration, etc.). Processor 207 may retrieve the type, magnitude, frequency, duration, or other characteristics of the haptic effect from a memory 209 coupled to processor 207. The haptic effects provide the user with the feeling that controller 104 with a greater sense of immersion to the game as multiple modalities are being simultaneously engaged, e.g., video, audio, and haptics.

Figure 4:
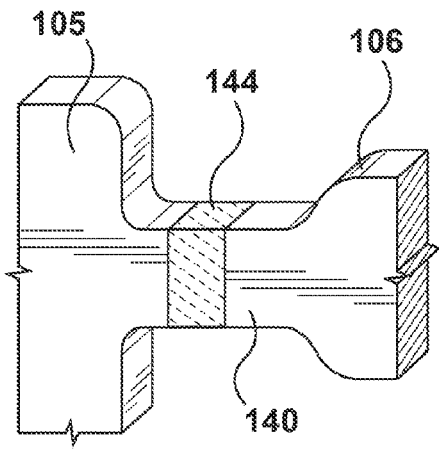
FIG. 4 is a schematic illustration of an embodiment of a vibration isolation device for isolating handles of the gaming tablet of FIG. 1.
Figure 5:
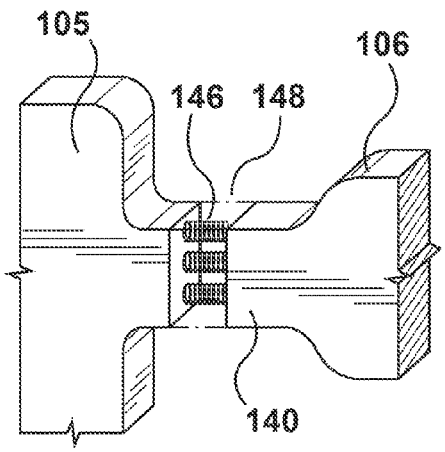
FIG. 5 is a schematic illustration of another embodiment of vibration isolation device for isolating handles of the gaming tablet of FIG. 1.

FIGS. 4-5 show a portion of controller 102 of FIG. 1. In particular, FIGS. 4-5 show the portion of controller 102 of FIG. 1 where handle 106 is connected to docking portion 105 through arm or connector 140. As shown in FIGS. 4-5, arm 140 includes a vibration isolation barrier 144, 146 substantially mechanically isolating handle 106 from docking portion 105. In particular, FIG. 4 shows vibration isolation barrier 144 substantially mechanically isolating handle 106 from docking portion 105. Vibration isolation barrier 144 as shown in FIG. 4 is a vibration dampening material, such as foam materials, urethane foams (Poron® foam), polyurethane, viscoelastic materials, rubber, and other materials that generally isolate vibrations but maintain a relative rigidity so that the feel and integrity of the outer housing of controller 102 is maintained. Further, a housing (not shown) may surround vibration isolation barrier 144 such that controller 102 has a continuous appearance. However, care should be taken that the housing (not shown) does not permit transfer of significant vibration from handle 106 to docking portion 104.

Similarly, vibration isolation barrier 146 shown in FIG. 5 is a plurality of springs. Vibration isolation barrier 146 may include a housing 148 (shown clear in FIG. 5) surrounding it to maintain the appearance of a housing. Housing 148 may be made of materials that generally filter vibrations such as the materials described above with respect to FIG. 4 such that vibrations are not transferred from handle 106 to docking portion 105 through housing 148. Although vibration isolation barrier 146 is shown as a plurality of springs, those skilled in the art would recognize that other materials and designs that function as springs may be utilized.

FIGS. 6-18 show various embodiments for actuators attached to user input elements with various isolation devices to isolate the user input element or portions thereof from the controller housing. FIGS. 6-18 are described with respect to controller 102 shown in FIG. 1. Accordingly, FIGS. 6-18 use reference numerals from FIG. 1, such as joystick 110, button 114, and trigger 118. However, the embodiments shown in FIGS. 6-18 can equally be used on the user input elements shown in FIGS. 2-3. Accordingly, joystick 110, button 114, trigger 118, and their corresponding actuators 112, 116, 118 can instead be joystick 210, button 214, trigger 218, and their corresponding actuators 212, 216, 218. For clarity of the drawings and so as not to repeat the drawings, the reference numerals from FIG. 1 have been used.

Figure 6:
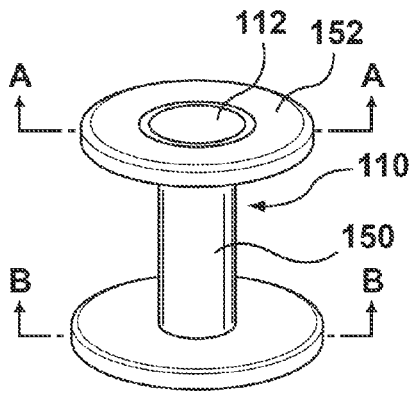
FIG. 6 is a schematic illustration of a joystick of a controller with an actuator attached thereto.

FIG. 6 shows a close-up view of joystick 110. Joystick 110 includes a base or stem 150, a cap or top 152, and actuator 112 coupled to cap 152. Actuator 112 is coupled to cap 152 generally where a user would contact cap 152 of joystick 110 to cause action within the game, such as moving a player or object of the game. Base 150 is generally cylindrical in shape and cap 152 is generally disc-shaped, although other shapes may be utilized. Movement and/or depression of joystick 110 sends a signal to processor 107 for an action to take place in the game. Further, depending on game action, processor 107 may at times send a signal to actuator 112 of joystick 110 to vibrate or cause some other mechanical haptic effect. Due to the actuator 112 being coupled to cap 152 and the vibration isolation/dampening described below, a relatively smaller actuator may be used to provide the haptic effect.

Figure 7:
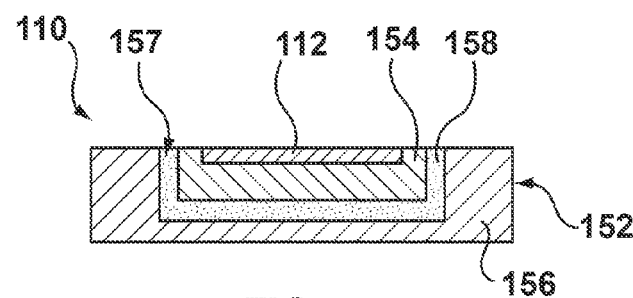
FIG. 7 is a schematic illustration of an embodiment of a cross-sectional view taken along line A-A of FIG. 6.

FIG. 7 shows an embodiment of cap 152 of actuator 110. As can be seen in FIG. 7, actuator 112 is coupled to an isolated portion 154 of cap 152. Isolated portion 154 of cap 152 is separated from body 156 of cap 152 by a groove or gap 157 which is filled with a vibration isolation barrier 158, thereby substantially mechanically isolating isolated portion 154 of cap 152 from body 156 of cap 152. Vibration isolation barrier 158 as shown in FIG. 7 is a vibration dampening material, such as foam materials, urethane foams (Poron® foam), polyurethane, viscoelastic materials, rubber, and other materials that generally isolate vibrations but maintain a relative rigidity so that the feel and integrity of the cap 152 is maintained.

Figure 9:
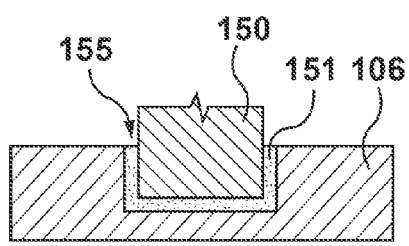
FIG. 9 is a schematic illustration of an embodiment of a cross-sectional view taken along line B-B of FIG. 6.
Figure 8:
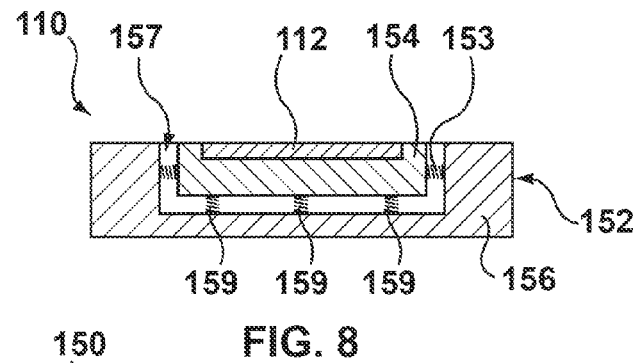
FIG. 8 is a schematic illustration of another embodiment of a cross-sectional view taken along line A-A of FIG. 6.

In another embodiment, shown in FIG. 8, actuator 112 is attached to isolated portion 154 of cap 152. Isolated portion 154 is separated from body 156 of cap 152 by gap 157. In the embodiment of FIG. 9, the vibration isolation barrier comprises a spring or plurality of springs 159 to couple isolated portion 154 to body 156. Springs 159 filter vibration between isolated portion 154 and body 156 such that vibrations or other mechanical effects of actuator 112 are substantially mechanically isolated to isolated portion 154, and are therefore not transferred to body 156. Springs 159 are selected to filter vibrations but to maintain sufficient feel in joystick 110 such that movements of joystick 110 accurately translate to movements in the game. Although the vibration isolation barrier of FIG. 8 is shown as a plurality of springs, those skilled in the art would recognize that other materials and designs that function as springs filter the vibrations may be utilized.

FIGS. 7 and 8 describe a vibration dampening material and springs to dampen/filter vibrations. Although these are shown as separate embodiments, those skilled in the art would recognize that vibration isolation may include and generally will include both dampening and filtering. Accordingly, the embodiments may be combined or materials that both dampen and filter vibrations may be utilized.

Figure 10:
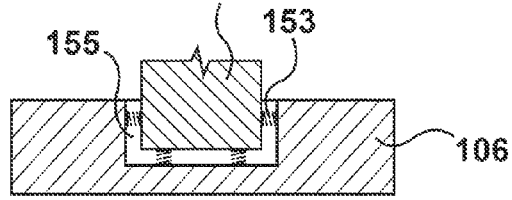
FIG. 10 is a schematic illustration of another embodiment of a cross-sectional view taken along line B-B of FIG. 6.

In another embodiment, shown in FIGS. 9 and 10, rather than substantially mechanically isolating cap 152 from the remainder of joystick 110, and therefore the remainder of handle 106, joystick 110 is substantially mechanically isolated from handle 106 where base 150 is coupled to handle 106. As shown in FIGS. 9 and 10, a gap 155 separates base 150 from handle 106. In one embodiment, shown in FIG. 9, a vibration isolation barrier 151 fills gap 155, thereby substantially mechanically isolating base 150 of joystick 110 from handle 106. Vibration isolation barrier 158 as shown in FIG. 9 is a vibration dampening material, such as foam materials, urethane foams (Poron® foam), polyurethane, viscoelastic materials, rubber, and other materials that generally isolate vibrations but maintain a relative rigidity so that the feel and integrity of the joystick 110 is maintained.

In another embodiment shown in FIG. 10, the vibration isolation barrier is a plurality of springs 153 such that gap 151 is bridged by springs 153 to couple base 150 to handle 106. Springs 153 filter vibrations between base 150 and handle 106 such that vibrations or other mechanical effects of actuator 112 are substantially mechanically isolated to joystick 110, and therefore are not transferred to handle 106. Springs 153 are selected to filter mechanical vibration but maintain feel in joystick 110 such that movements of joystick 110 accurately translate to movements in the game.

FIGS. 9 and 10 describe a vibration dampening material and springs to dampen/filter vibrations. Although these are shown as separate embodiments, those skilled in the art would recognize that vibration isolation may include and generally will include both dampening and filtering. Accordingly, the embodiments may be combined or materials that both dampen and filter vibrations may be utilized.

Figure 11:
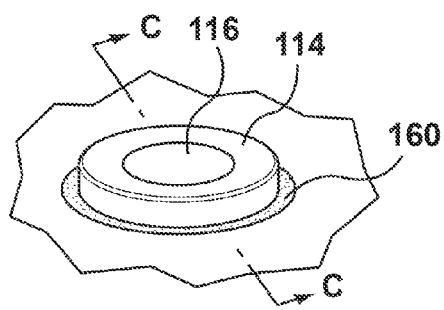
FIG. 11 is a schematic illustration of a button of a controller with an actuator attached thereto.

FIGS. 11-14 show embodiments substantially mechanically isolating vibrations of actuator 116 coupled to button 114. As shown in FIG. 11, button 114 is coupled to handle 106 with actuator 116 coupled thereto. Depressing button 114 sends a signal to processor 107, which is processed to cause an action in the game. Further, depending on the purpose of button 114 and game action, processor 107 may send a signal to actuator 116 to vibrate or cause some other haptic effect, as described above.

Figure 12:
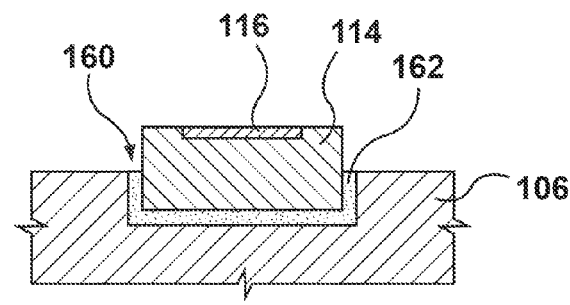
FIG. 12 is a schematic illustration of an embodiment of a cross-sectional view taken along line C-C of FIG. 11.

FIG. 12 shows an embodiment of button 114 coupled to handle 106 taken along line C-C of FIG. 11. As can be seen in FIG. 12, a gap 160 is disposed between button 114 and handle 106. Gap 160 is filled with a vibration isolation barrier 162, thereby substantially mechanically isolating button 114 from handle 106. Vibration isolation barrier 162 as shown in FIG. 12 is a vibration dampening material, such as foam materials, urethane foams (Poron® foam), polyurethane, viscoelastic materials, rubber, and other materials that generally isolate vibrations but maintain a relative rigidity so that the feel and integrity of the button 114 is maintained.

Figure 13:
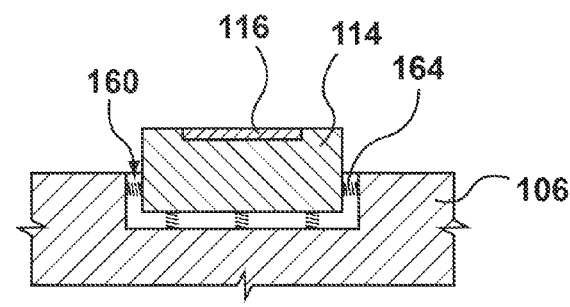
FIG. 13 is a schematic illustration of another embodiment of a cross-sectional view taken along line C-C of FIG. 11.

In another embodiment, shown in FIG. 13, button 114 is separated from handle 106 by gap 160. The vibration isolation barrier is a spring or plurality of springs 164 that couples button to handle 106. Springs 164 filter vibrations between button 114 and handle 106 such that vibrations or other mechanical effects of actuator 114 are substantially mechanically isolated to button 114, and are therefore not transferred to handle 106. Springs 164 are selected to filter vibrations but to maintain sufficient feel in button 114 such that movements of button 114 accurately translate to movements in the game.

Figure 14:
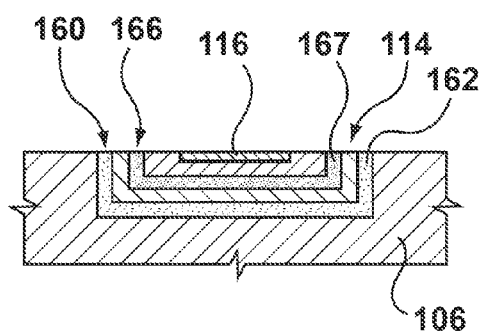
FIG. 14 is a schematic illustration of an embodiment of a cross-sectional view taken along line C-C of FIG. 11.

In another embodiment, shown in FIG. 14, actuator 116 is coupled to an isolated portion 168 of button 114. Isolated portion 168 of button 114 is separated from body 169 of button 114 by a groove or gap 166 which is filled with a vibration isolation barrier 167, thereby substantially mechanically isolating isolated portion 168 of button 114 from body 169 of button 114. Vibration isolation barrier 167 as shown in FIG. 14 is a vibration dampening material, such as foam materials, urethane foams (Poron® foam), polyurethane, viscoelastic materials, rubber, and other materials that generally isolate vibrations but maintain a relative rigidity so that the feel and integrity of button 114 is maintained. Body 169 of button 114, as shown in FIG. 14, is also substantially mechanically isolated from handle 106 by gap 160 and vibration isolation barrier 162. However, those skilled in the art would recognize that gap 160 and vibration isolation barrier 162 are not required and that conventional attachment methods and devices may be used to couple body 169 to handle 106. Further, although FIG. 14 shows a vibration isolation barrier material 167 between isolated portion 168 and body 169, those skilled in the art would recognize that other vibration isolation barriers, such as springs or a plurality of springs, may be used.

FIGS. 12-14 describe a vibration dampening material and springs to dampen/filter vibrations. Although these are shown as separate embodiments, those skilled in the art would recognize that vibration isolation may include and generally will include both dampening and filtering. Accordingly, the embodiments may be combined or materials that both dampen and filter vibrations may be utilized.

Figure 15:
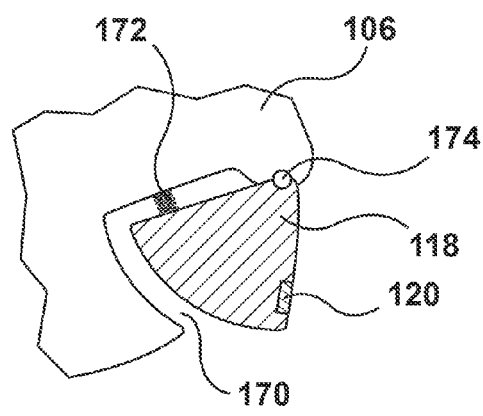
FIG. 15 is a schematic illustration of an embodiment of a cross-sectional view of a trigger of a controller with an actuator attached thereto.

FIGS. 15-18 show embodiments substantially mechanically isolating vibrations of actuator 120 coupled to trigger 118. As shown in FIG. 15, trigger 118 is coupled to handle 106 through connection 174. Connection 174 may be a hinged connection or other type of connection known to those skilled in the art. Depressing button 118 sends a signal to processor 107, which is processed to cause an action in the game. Further, depending on the purpose of trigger 118 and game action, processor 107 may send a signal to actuator 120 to vibrate or cause some other haptic effect, as described above. For example, and not by way of limitation, in some games squeezing trigger 118 may send a signal to processor 107 to cause a gun or other weapon in the game to fire. Processor 107 may send a signal to actuator 120 to cause a vibration, pop, detent, or other mechanical haptic effect, such as to simulate the feel of the weapon being fired.

FIG. 15 shows an embodiment of trigger 118 coupled to handle 106. As can be seen in FIG. 15, a gap 170 is disposed between trigger 118 and handle 106. A vibration isolation barrier is a spring or plurality of springs 172 that couples trigger 118 to handle 106 across gap 170. Spring 172 filters vibration between trigger 118 and handle 106 such that vibrations or other mechanical effects of actuator 120 are substantially mechanically isolated to trigger 114, and are therefore not transferred to handle 106. Spring 172 is selected to filter vibrations but to maintain sufficient feel in trigger 118 such that movements of trigger 118 accurately translate to movements in the game.

Figure 16:
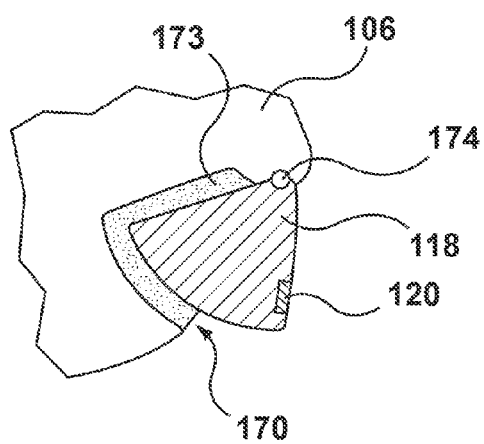
FIG. 16 is a schematic illustration of another embodiment of a cross-sectional view of a trigger of a controller with an actuator attached thereto.

FIG. 16 shows another embodiment of trigger 118 coupled to handle 106. As can be seen in FIG. 16, gap 170 is filled with a vibration isolation barrier 173, thereby substantially mechanically isolating trigger 118 from handle 106. Vibration isolation barrier 173 as shown in FIG. 16 is a vibration dampening material, such as foam materials, urethane foams (Poron® foam), polyurethane, viscoelastic materials, rubber, and other materials that generally isolate vibrations but maintain a relative rigidity so that the feel and integrity of the trigger 118 is maintained.

Figure 17:
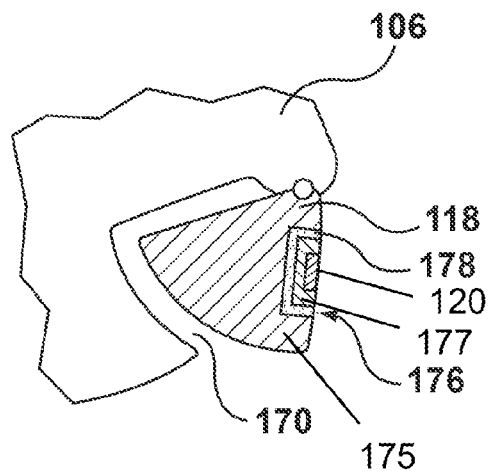
FIG. 17 is a schematic illustration of another embodiment of a cross-sectional view of a trigger of a controller with an actuator attached thereto.

In another embodiment, shown in FIG. 17, actuator 120 is coupled to an isolated portion 177 of trigger 118. Isolated portion 177 of trigger 118 is separated from body 175 of trigger 118 by a groove or gap 176 which is filled with a vibration isolation barrier 178, thereby substantially mechanically isolating isolated portion 177 of trigger 118 from body 175 of trigger 118. Vibration isolation barrier 178 as shown in FIG. 17 is a vibration dampening material, such as foam materials, urethane foams (Poron® foam), polyurethane, viscoelastic materials, rubber, and other materials that generally isolate vibrations but maintain a relative rigidity so that the feel and integrity of trigger 118 is maintained. Body 175 of trigger 118, as shown in FIG. 17, may also be substantially mechanically isolated from handle 106 by gap 170 and a vibration isolation barrier such as shown in FIGS. 15 and 16. However, those skilled in the art would recognize that such a vibration isolation barrier is not required and that conventional attachment methods and devices may be used to couple body 175 to handle 106.

Figure 18:
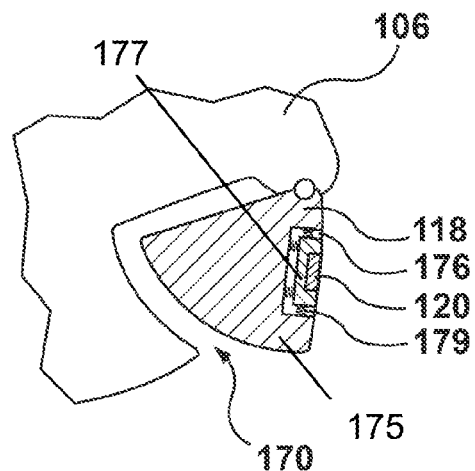
FIG. 18 is a schematic illustration of another embodiment of a cross-sectional view of a trigger of a controller with an actuator attached thereto.

In another embodiment, shown in FIG. 18, actuator 120 is coupled to isolated portion 177 of trigger 118. The vibration isolation barrier in FIG. 18 is a spring or plurality of springs 179 that couples isolated portion 177 to body 175 across gap 176. Springs 179 filter vibrations between isolated portion 177 and body 175 such that vibrations or other mechanical effects of actuator 120 are substantially mechanically isolated to isolated portion 177, and therefore are not transferred to through body 175 to handle 106. Springs 179 are selected to filter mechanical vibrations but maintain feel in trigger 118 such that movements of trigger 118 accurately translate to movements in the game. Body 175 of trigger 118, as shown in FIG. 18, may also be substantially mechanically isolated from handle 106 by gap 170 and a vibration isolation barrier such as shown in FIGS. 15 and 16. However, those skilled in the art would recognize that such a vibration isolation barrier is not required and that conventional attachment methods and devices may be used to couple body 175 to handle 106.

FIGS. 15-18 describe vibration dampening materials and springs to dampen/filter vibrations. Although these are shown as separate embodiments, those skilled in the art would recognize that vibration isolation may include and generally will include both dampening and filtering. Accordingly, the embodiments may be combined or materials that both dampen and filter vibrations may be utilized.

Figure 19:
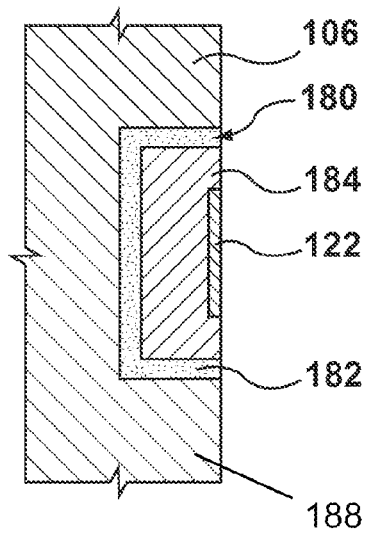
FIG. 19 is a schematic illustration of an embodiment of a cross-sectional view of a portion of a housing of a controller with an actuator attached thereto.
Figure 20:
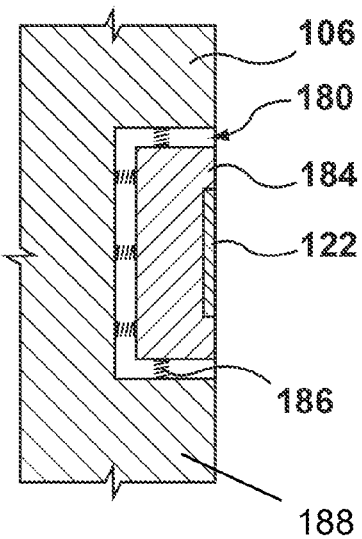
FIG. 20 is a schematic illustration of another embodiment of a cross-sectional view of a portion of a housing of a controller with an actuator attached thereto.

FIGS. 19-20 show embodiments of substantially mechanically isolating actuator 122 coupled to a portion of handle 106 from the remainder of handle 106. Although described with respect to actuator 122, the embodiments of FIG. 19-20 may apply equally to actuator 124, or actuators disposed elsewhere on handle 106. In particular, FIG. 19 shows actuator 122 coupled to an isolated portion 184 of handle 106. Isolated portion 184 of handle 106 is separated from the body 188 of handle 106 by a groove or gap 180 which is filled with a vibration isolation barrier 182, thereby substantially mechanically isolating isolated portion 184 of handle 106 from body 188 of handle 106. Vibration isolation barrier 184 as shown in FIG. 19 is a vibration dampening material, such as foam materials, urethane foams (Poron® foam), polyurethane, viscoelastic materials, rubber, and other materials that generally isolate vibrations but maintains a relative rigidity so that the feel and integrity of handle 106.

In another embodiment, shown in FIG. 20, actuator 122 is coupled to isolated portion 184 of handle 106. The vibration isolation barrier of FIG. 20 is a spring or plurality of springs 186 that couples isolated portion 184 to body 188 across gap 180. Springs 186 filter vibrations between isolated portion 184 and body 188 such that vibrations or other mechanical effects of actuator 122 are substantially mechanically isolated to isolated portion 184, and therefore are not transferred to body 188, i.e., the rest of handle 106. Springs 186 are selected to filter mechanical vibrations but maintain a relative rigidity so that the feel and integrity of handle 106.

FIGS. 18 and 19 describe vibration dampening materials and springs to dampen/filter vibrations. Although these are shown as separate embodiments, those skilled in the art would recognize that vibration isolation may include and generally will include both dampening and filtering. Accordingly, the embodiments may be combined or materials that both dampen and filter vibrations may be utilized.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A user input device comprising:
    a housing;
    a user input element configured to send a signal to a processor, the user input element including: (a) a first user contact portion configured for contact with a user; and (b) a second user contact portion configured for contact with the user;
    an actuator attached to the first user contact portion of the user input element, the actuator configured to receive a control signal from the processor and output a haptic effect to the first user contact portion of the user input element in response to the control signal from the processor; and
    a vibration isolation barrier disposed between the first user contact portion of the user input element and the second user contact portion of the user input element, wherein the vibration isolation barrier substantially mechanically isolates the first user contact portion from the second user contact portion,
    wherein the user input element is selected from the group consisting of a trigger, a joystick, and a button.

2. The user input device of claim 1, wherein the vibration isolation barrier is a material selected from group consisting of foam materials, urethane foams, polyurethane, viscoelastic materials, and rubber.

3. The user input device of claim 2, wherein the material is urethane foam.

4. The user input device of claim 1, wherein the vibration isolation barrier is a spring.

5. The user input device of claim 1, wherein the user input element is a joystick.

6. The user input device of claim 5, wherein the joystick includes a stem and a cap.

7. The user input device of claim 6, wherein the first user contact portion of the user input element is a first portion of the cap, the second user contact portion of the user input element is a second portion of the cap, and the vibration isolation barrier is disposed between the first portion of the cap and the second portion of the cap.

8. The user input device of claim 1, wherein the user input element is a button.

9. The user input device of claim 1, wherein the user input element is a trigger.

10. The user input device of claim 1, wherein the user input device is a game controller.

11. A user input device comprising:
    a user input element configured to send a signal to a processor, the user input element including a first portion configured for a user to contact the first portion to operate the user input element and a second portion adjacent the first portion, the second portion being configured for the user to contact;
    an actuator attached to the first portion of the user input element, the actuator configured to receive a control signal from the processor and output a haptic effect to the first portion of the user input element in response to the control signal from the processor; and
    a vibration isolation barrier disposed between the first portion of the user input element and the second portion of the user input element, wherein the vibration isolation barrier substantially mechanically isolates the first portion from the second portion,
    wherein the user input element is selected from the group consisting of a trigger, a joystick, and a button.

12. The user input device of claim 11, wherein the vibration isolation barrier is a material selected from group consisting of foam materials, urethane foams, polyurethane, viscoelastic materials, and rubber.

13. The user input device of claim 12, wherein the material is urethane foam.

14. The user input device of claim 11, wherein the vibration isolation barrier is a spring.

15. The user input device of claim 11, wherein the user input element is a joystick.

16. The user input device of claim 15, wherein the joystick includes a stem and a cap, wherein the first portion of the user input element is a first portion of the cap, the second portion of the user input element is a second portion of the cap, and the vibration isolation barrier is disposed between the first portion of the cap and the second portion of the cap.

17. The user input device of claim 11, wherein the user input element is a button.

18. The user input device of claim 11, wherein the user input element is a trigger.

19. The user input device of claim 11, wherein the user input device is a game controller.

20. A gaming system comprising:
    a host computer;
    a processor;
    a controller having a housing, a user input element, and an actuator attached to a first portion of the user input element configured for a user to contact the first portion to operate the user input element, wherein the user input element includes a second portion configured for the user to contact, wherein the user input element is configured to send a signal to the processor when operated and the actuator is configured to receive a control signal from the processor and output a haptic effect to the first portion of the user input element in response to the control signal from the processor; and
    a vibration isolation barrier disposed between the first portion of the user input element and the second portion of the user input element, wherein the vibration isolation barrier substantially mechanically isolates the first user contact portion from the second user contact portion,
    wherein user input element is selected from the group consisting of a button, a trigger, and a joystick.

21. The gaming system of claim 20, wherein the host computer is a tablet computer and the controller includes a handle and a docking station adapted to receive the tablet computer therein, wherein the user input element is disposed on the handle.

22. The gaming system of claim 20, wherein the processor is disposed in the controller.

23. The gaming system of claim 20, wherein the processor is disposed in the host computer.

24. The gaming system of claim 20, wherein the vibration isolation barrier is selected from the group consisting of foam materials, urethane foams, polyurethane, viscoelastic materials, rubber, and a spring.

* * * * *